United States Patent
Gupta et al.

[11] Patent Number: 5,809,463
[45] Date of Patent: Sep. 15, 1998

[54] METHOD OF DETECTING DOUBLE TALK IN AN ECHO CANCELLER

[75] Inventors: Sanjay Gupta; Prabhat K. Gupta, both of Germantown, Md.

[73] Assignee: Hughes Electronics, Los Angeles, Calif.

[21] Appl. No.: 528,967

[22] Filed: Sep. 15, 1995

[51] Int. Cl.[6] .................................................. G10L 9/00
[52] U.S. Cl. ...................... 704/233; 704/226; 704/227; 704/228
[58] Field of Search .................. 395/2.35, 2.36, 395/2.37, 2.42; 370/84

[56] References Cited

U.S. PATENT DOCUMENTS

| | | | |
|---|---|---|---|
| 3,787,645 | 1/1974 | Ochiai et al. | 379/410 |
| 4,005,277 | 1/1977 | Araseki et al. | 379/406 |
| 4,360,712 | 11/1982 | Horna | 379/406 |
| 4,535,445 | 8/1985 | Lane et al. | 370/268 |
| 4,577,071 | 3/1986 | Johnston et al. | 379/410 |
| 4,742,510 | 5/1988 | Quatieri, Jr. et al. | 379/290 |
| 4,918,727 | 4/1990 | Rohrs et al. | 379/410 |
| 5,132,963 | 7/1992 | Ungerboeck | 370/32.1 |
| 5,327,495 | 7/1994 | Shenoi et al. | 379/410 |
| 5,353,348 | 10/1994 | Sendyk et al. | 379/410 |
| 5,459,814 | 10/1995 | Gupta et al. | 395/2.42 |
| 5,463,618 | 10/1995 | Furukawa et al. | 370/32.1 |

*Primary Examiner*—Allen R. MacDonald
*Assistant Examiner*—Vijay B. Chawan
*Attorney, Agent, or Firm*—Wanda Denson-Low; John Whelan

[57] ABSTRACT

A method of detecting double talk in an echo canceller is provided. The method includes determining far end, near end and echo signal cancelled power, determining the presence of near end, maybe near end and far end speech, and controlling an echo suppressor and filter coefficient updates in an echo canceller.

13 Claims, 16 Drawing Sheets

METHOD OF DETECTING DOUBLE TALK IN AN ECHO CANCELLER

BACKGROUND OF THE INVENTION

The present invention relates to echo cancellers. More particularly, the present invention relates to a method of detecting double talk conditions in an echo canceller.

Echo cancellers are used in voice communication circuits to eliminate echoes, primarily caused by hybrid transformers which convert 2-wire circuits to 4-wire circuits. Typically, echo cancellers are based on the principle of adaptive transversal filtering. In these types of echo cancellers, the adaptive transversal filter replicates the true echo path with the opposite polarity to compensate for the imperfections of the hybrid.

Echo canceller performance is dependent to a great extent on the reliable detection of double talk. Double talk is the term used to describe the condition when parties on both ends of a communication line are speaking simultaneously. Double talk can degrade the performance of an echo canceller by preventing filter convergence on any echoes in the signal and by causing the echo canceller to overcompensate and filter the true speech with the echo. Because of the problems double talk presents, the filter coefficient update in the echo canceller filter has to be frozen during double talk to prevent the echo canceller from diverging. Also the suppressor in the echo canceller needs to be disabled during double talk so as not to suppress the near end speech.

Typically, echo cancellers only monitor the echo return loss enhancement (ERLE) value calculated from a signal to declare double talk. If the ELRE degrades by a fixed percentage, double talk is declared. However, this is not reliable as the ERLE can vary significantly with speech signals. Also, the ERLE degrades if the echo path changes. Some other methods of detecting double talk involve looking at the difference between the levels of near end and far end speech. This is not very reliable because the level of input speech and/or the echo return loss can vary by a wide margin. By declaring double talk too often, the update of the echo canceller coefficients is slowed resulting in longer convergence time.

Accordingly, there is a need for a method of detecting double talk that can differentiate between true double talk and the normal variation of ERLE with input speech and changes in echo path.

SUMMARY OF THE INVENTION

The presently preferred method of detecting a double talk condition is based on determining the status of various parameters of the echo canceller. These include the echo return loss (ERL), echo return loss enhancement (ERLE), near end speech, far end speech and maybe near end speech. By using the values from all these parameters a more reliable double talk detector is implemented. These parameters are also used to control the operation of the echo suppressor (to prevent clipping during double talk) and updating the coefficients (to prevent divergence during double talk).

DETAILED DESCRIPTION OF THE DRAWINGS

Figure 1:
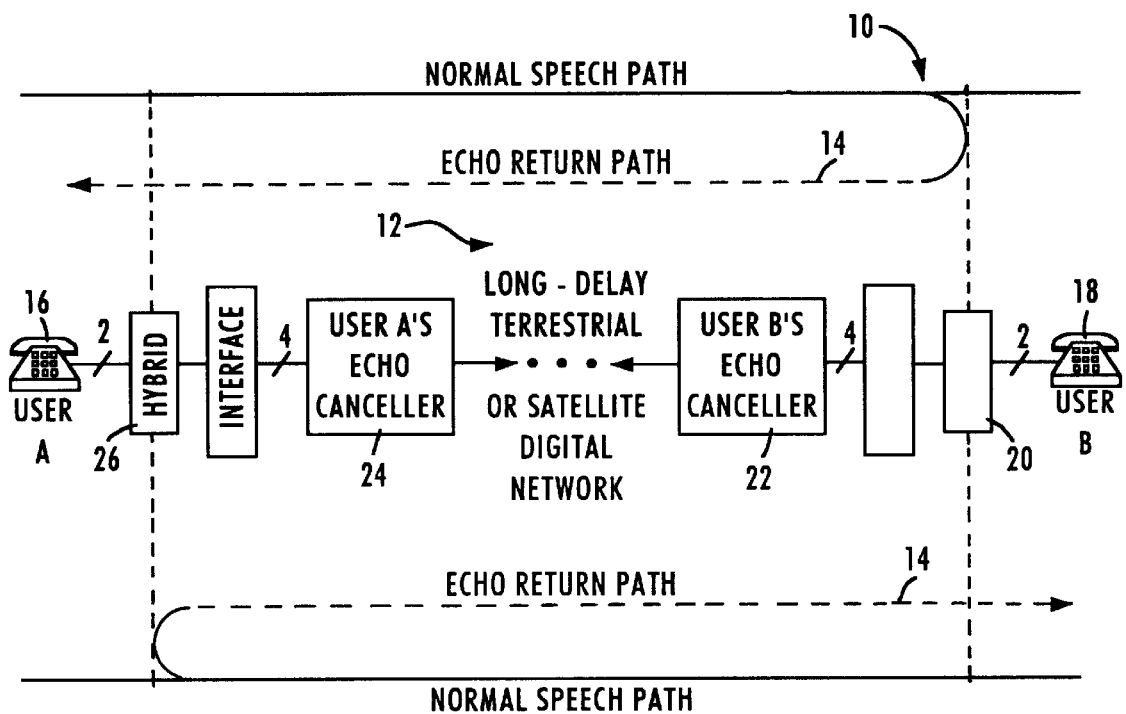
FIG. 1 is a block diagram illustrating a generic bidirectional transmission path in a communications system.

An echo canceller acts to filter or cancel out reflected signals that are generated in telephone communications. As background for the environment the presently preferred method may operate on, FIG. 1 illustrates a generic bidirectional transmission path. In a typical telephone conversation between two users communicating over a telephone network, echoes 14 made up of reflected energy may develop. If user A 16 speaks, part of the signal passes through the network 12 to user B 18 and part of the signal will often reflect back from the 4 wire to 2 wire hybrid 20 near user B. User B's echo canceller 22, operating properly, will filter out and suppress speech reflected back to user A from the hybrid 20. User A's echo canceller 24 operates to filter and suppress user B's speech reflected off the hybrid 26 near user A. The method of the present invention may operate within the echo cancellers 22, 24 shown in FIG. 1.

Figure 2:
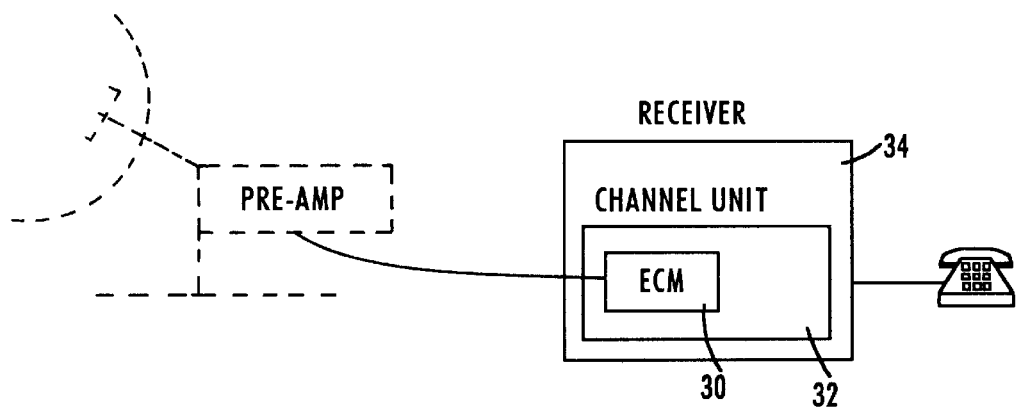
FIG. 2 is a block diagram of a satellite telephony ground station receiver that may be used with the method of the present invention.

A preferred embodiment of the present invention operates on an echo canceller module (ECM), which is a part of a channel unit in a satellite telephony ground station. Referring to FIG. 2, a satellite telephony ground station is shown having a channel unit and an echo canceller module inside the channel unit. The present method may be performed on a digital signal processor (DSP) in the echo canceller module. A Texas Instruments TMS C31 is one type of DSP which may be used. Because the voice quality of a satellite telephony network may be improved significantly, the network may replace terrestrial networks in many applications. The presently preferred embodiment may also be incorporated in any wireless communication system or land line network.

Several parameters are computed for use in to declaring double talk, controlling the operation of the echo suppressor and controlling filter coefficient updates. The five main parameters necessary for operation of the double talk detector are near end signal power (s_power), far end signal power (y_power), echo canceller power (u_power), the echo factor known as echo return loss (ERL), and the echo canceller factor known as echo return loss enhancement (ERLE).

Power computation of the near end power, far end power and the echo cancelled speech power is necessary, directly or indirectly in designing the double talk detector. Near end power refers to average signal levels originating from the end of the communications link closest to the echo canceller of interest. Far end power refers to the average signal levels originating from the end of the communications link away from the echo canceller of interest. The echo cancelled signal power is the power of the signal at the output of the echo canceller filter. These powers are computed every sample. A sample corresponds to 0.125 milliseconds of signal such that 20 milliseconds of signal equals 160 samples. The three power calculations are preferably computed as running averages over 32 samples. Each of these three powers may be calculated using the equation:

$$power = 31*power/32 + |sample|/32$$

where |sample| is the absolute value of the digitized sample and power is y_power, s_power or u_power depending on which of the three is being calculated.

Y_power and s_power inverses are also calculated because the y_power inverse is used both in the foreground filter coefficient update routine and to compute the echo factor (ERL). Inverse s_power is used to compute the echo canceller factor (ERLE). ERLE is computed as the running average of the ratio of the u_power and s_power over 512 samples as follows:

$$ERLE = 511*ERLE/512 + u\_power/s\_power/512$$

Figure 3A:
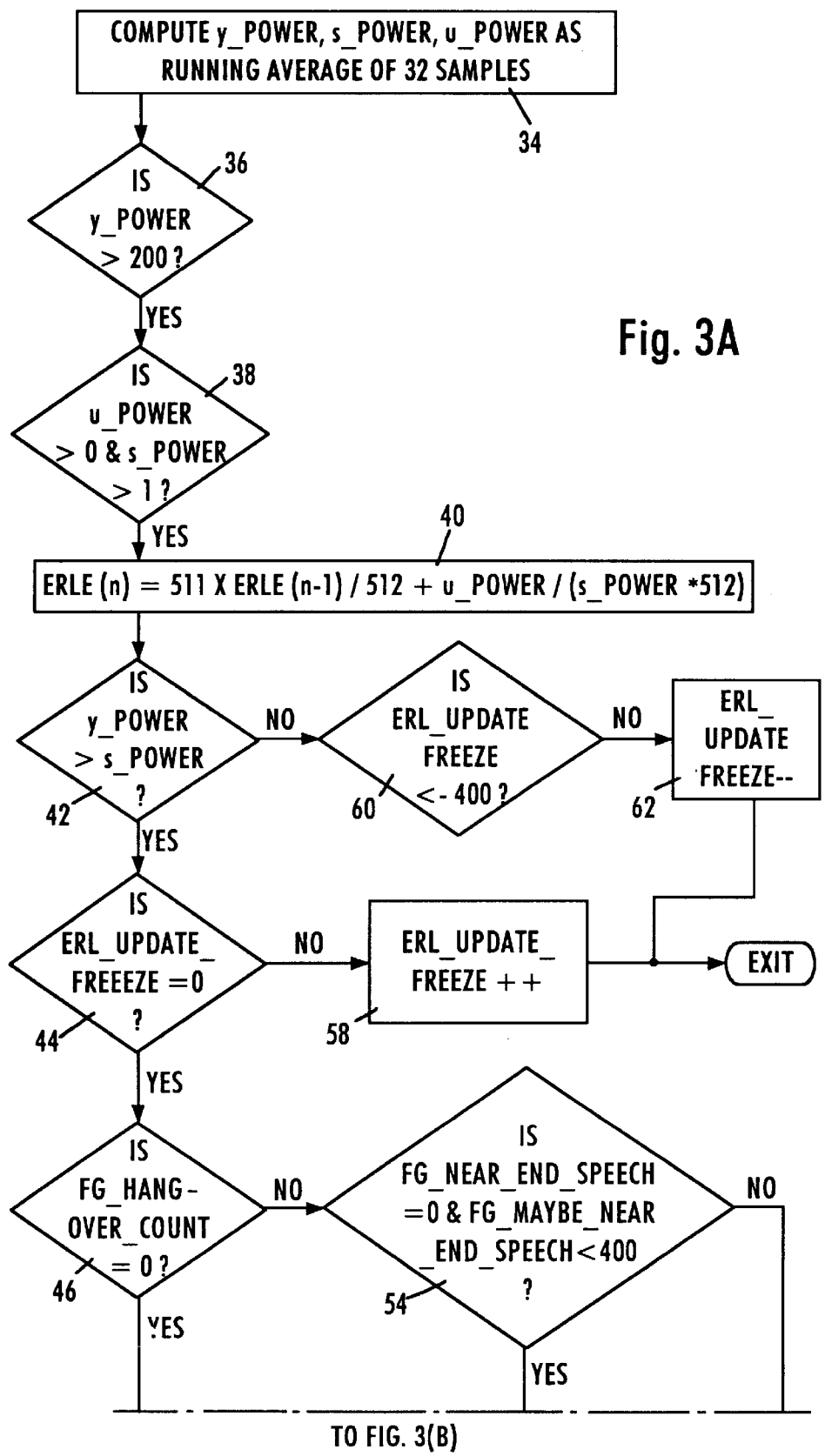
FIG. 3 is a flow diagram illustrating a method of updating echo factor (ERL) and echo canceller factor (ERLE) according to a presently preferred embodiment.
Figure 3B:
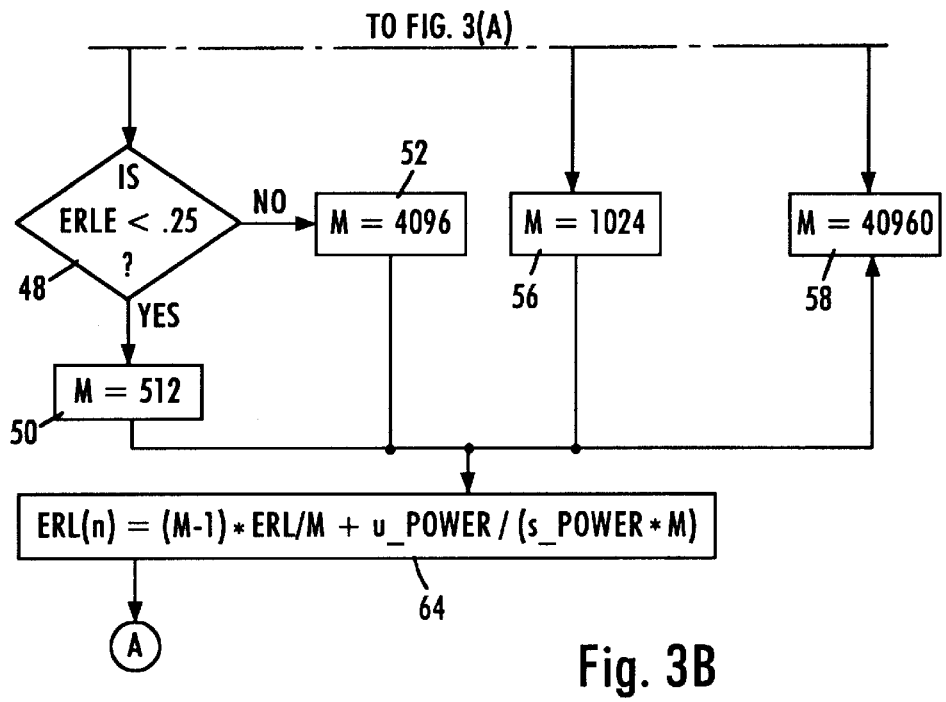

Every 20 milliseconds (160 samples), the current ERLE value may be stored in a 8 sample long buffer (ERLE_buf). Preferably, the information in the buffer is used in the detection of double talk as described below. Both ERL and ERLE are computed only if far end signal energy is greater than a preset threshold, preferably 200. The exact operation of the computation to determine whether and when to update ERL and/or ERLE is set forth in FIG. 3.

The double talk detector first verifies 36 that the minimum preset far end power is present. Assuming this is true, ERLE is computed 40, as described above if 38 echo cancelled power is greater than zero and near end power is greater than 1. If 42 far end power is greater than near end power, ERL_update_freeze is checked. This is a flag which decrements in steps of one everytime s_power exceeds y_power. It increments to zero when the above is not true. If the ERL_update_freeze is zero, FG_hangover_counter is checked. This is a hangover counter which is incremented to a maximum of 512 when near end speech or maybe near end speech is present (see FIG. 3). If 46 FG_hangover_counter is zero, ERLE is checked 48. For ERLE less than 0.25, M is 50 set to 512 else it is set to 4096. If FG_hangover_counter is not zero, FG_near_end_speech and FG_maybe_near_end_speech are checked. If they are below a threshold, M is set to 1024 else it is set to 40960. M determines the rate at which ERL is updated. The higher the value of M, the slower the update rate. Whenever a new value of M is computed in any of the loops illustrated in FIG. 3, then ERL is computed 64 according to the following equation:

$$ERL = (M-1)*ERL/M + u\_power/(s\_power*M)$$

Far end speech power is used to detect far end speech. Far end speech controls the update of the coefficients of the echo canceller. It is also one of the criteria to activate the residual suppressor. The logic to detect the far end speech condition set forth in FIG. 4.

Figure 4:
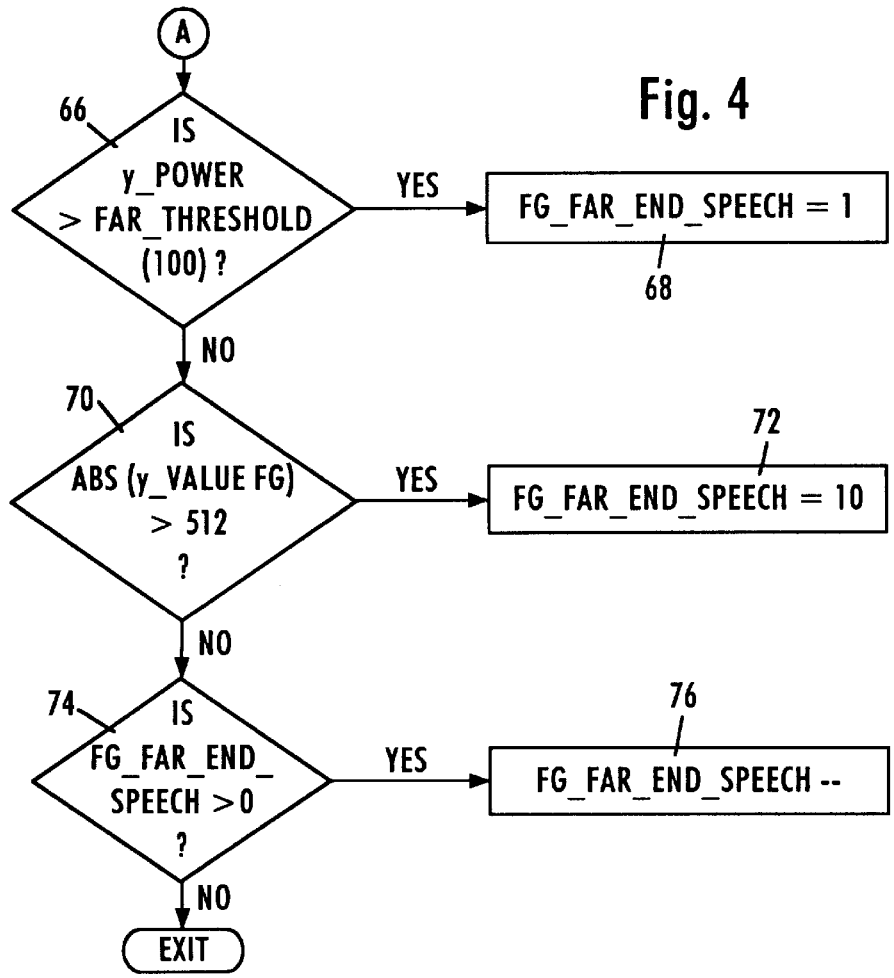
FIG. 4 is a flow diagram illustrating a preferred method of detecting for end speech.

As seen in FIG. 4, the far end speech power must be above a predetermined threshold to signify the presence of far end speech. Thus, far end speech is 68 declared present if 66 y_power exceeds a minimum threshold and the far end speech flag is set to 1'. The threshold is computed based on the fact that noise should not be able to trigger the flag but low level speech should. The threshold is preferably 100.

A second check, for an individual sample having a high power level, is 70 also performed so that tones and sudden level transitions are detected early and the echo suppressor logic can be activated to prevent any echo. The value of the FG_far_$_{end}$_speech flag is 72 set to ten if an impulse or sudden transition sets the flag, to prevent the flag from resetting if the next sample is below the threshold and the average power has not yet crossed the minimum threshold. If 74 there is no far end signal detected above the threshold and the current sample is less than 512, the FG_far_$_{end}$_ speech flag is decremented 76 to zero in steps of 1.

There is another flag designated FG_low_far_end_ speech, which is used to detect very low far end speech. The low far end speech flag is used in the echo suppressor. This is an on/off flag taking a value of one as long as the far end signal power is between 50 and 100 and is zero otherwise.

Maybe near end speech is another possible state that the double talk detector in the echo canceller preferably detects. The maybe-near-end speech flag is incremented when there is a probability that near end speech began after far end speech started. The flag is called maybe-near-end-speech because the sudden change in near end echo levels/signal levels can also be due to the change in echo path/ characteristics rather than from double talk. Detection of this condition is essential in determining double talk so as not to confuse a change in echo path with double talk.

Figure 5:
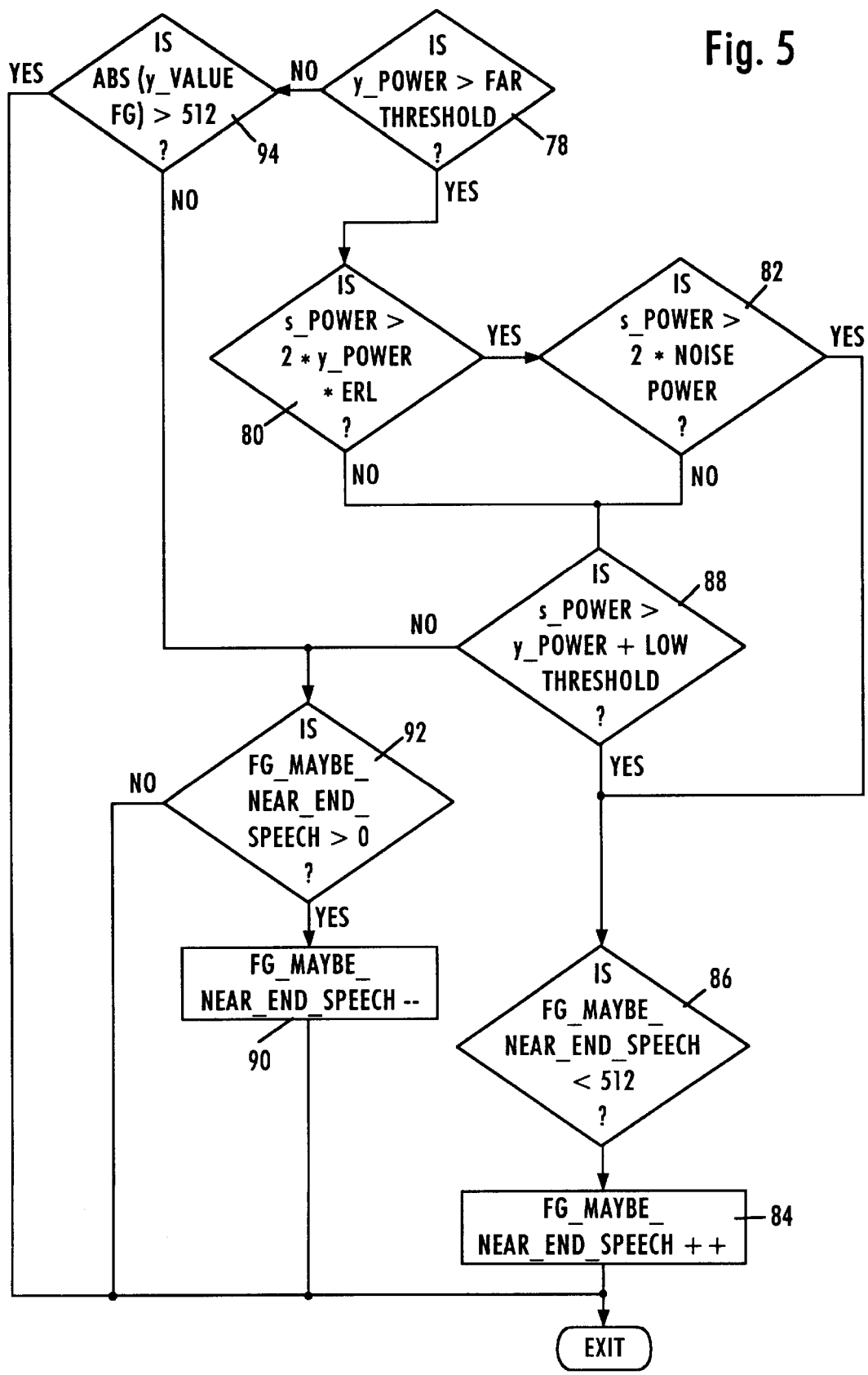
FIG. 5 is a flow diagram showing a preferred method of declaring a doubler talk condition.

As shown in FIG. 5, this logic is purely based on the knowledge of the true echo path loss and the relative near end and far end signal power levels. A precondition for determining maybe near end speech is that the far end power is 78 above a threshold, preferably 100. S_power is 80 compared to y_power multiplied by twice the echo factor (ERL) and is also compared to 82 twice the noise power. The comparison 80 to twice the ERL is done because the near end and far end power levels might not follow each other purely as the function of true ERL due to the delay and multiple echo paths. Assuming that near end power is greater than the two values, the FG_maybe_near_end_speech flag is 84 incremented if 86 the present value of FG_maybe_near_end_speech is less than 512.

If the near end signal is 80, 82 less than the above two values, but is greater than the sum of the y_power and a low threshold (preferably set at 50), the FG_maybe_near_ end_speech flag is 84 incremented if 86 FG_maybe_ near_end_speech is less than 512. Otherwise, if 88 near end power is less than the sum of the far end power and the threshold value, the FG_maybe_near_end_speech flag is 90 decremented if 92 its present value is greater than zero.

If 78 the far end signal power is less than or equal to the threshold and 94 the absolute value of a far end signal sample is less than or equal to 512, FG_maybe_near_ end_speech is 90 decremented if FG_maybe_near_end_ speech is greater than zero.

The maybe near end speech flag is used to prevent clipping during double talk if the near end user begins talking while the far end user is talking. The FG_maybe_ near_end flag is compared to very high thresholds because the criteria that can indicate a maybe near end condition can also be the result of a change in echo path. The reaction time for this process of setting the flag to detect double talk is of the order of 64 milliseconds.

Similar to maybe near end speech, near end speech is identified by examining the relationships between near end and far end signal powers. Detection of near end speech is necessitated by the need to detect double talk if far end speech comes after the near end user has begun talking. If near end speech is identified, the echo canceller provides additional, or "hangover", time that will prevent the echo canceller from updating its coefficients and the suppressor from clipping the near end speech. If near end speech is present, it increments the FG_near_end_speech flag within predetermined bounds. A preferred method of detecting near end speech is illustrated in FIG. 6

Figure 6:
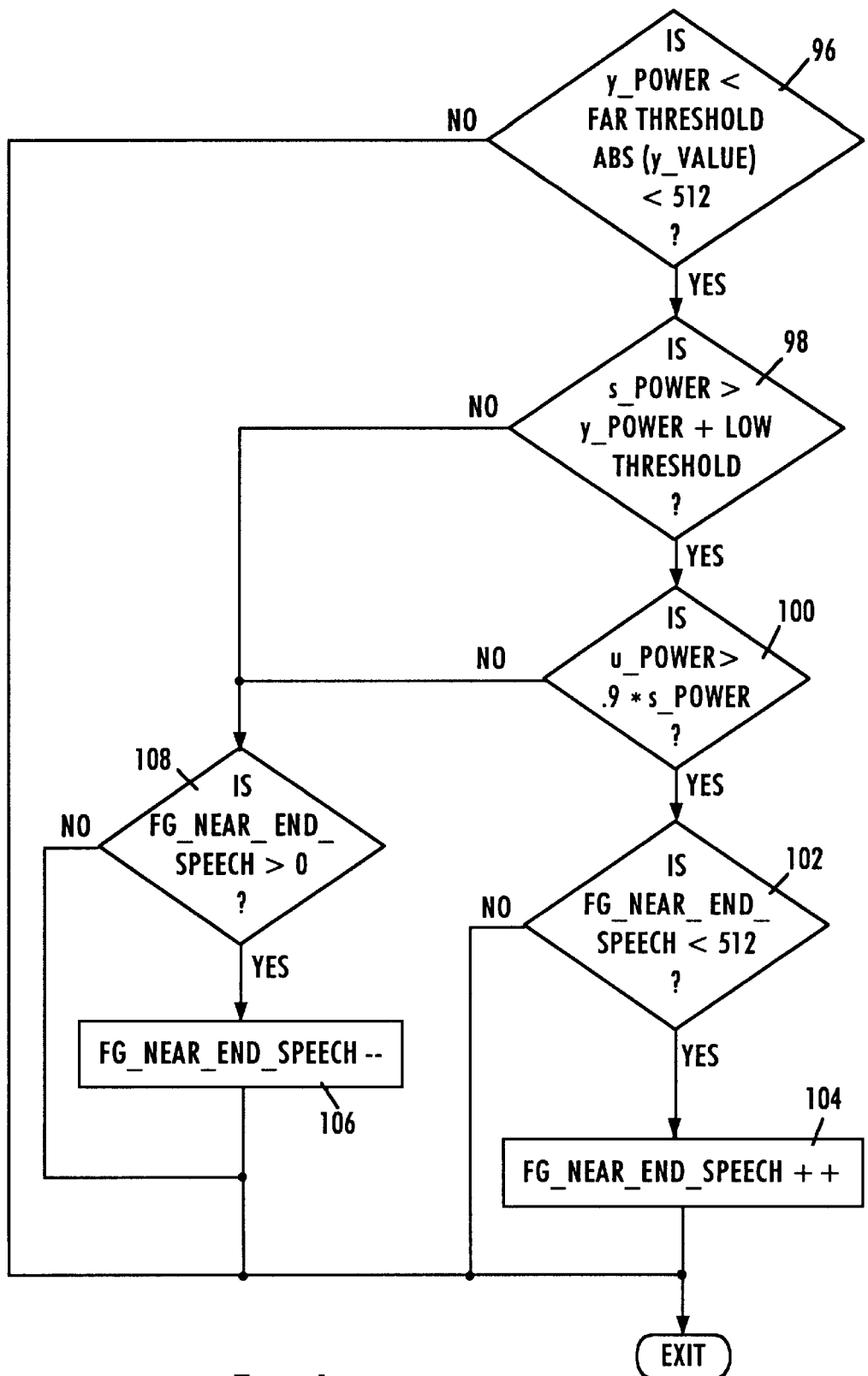
FIG. 6 is a flow diagram illustrating a preferred method of detecting near end speech.

As is shown in FIG. 6, if 96 far end power is below a far threshold value and the absolute value of the far signal sample is less then 512, then if 98 the near end power is greater than the sum of far end signal power and a predetermined low threshold, the echo cancelled power is 100 greater than 90% of the near end signal power, and the near end speech flag (FG_near_end_speech) value is 102 less than 512, the near end speech flag is 104 incremented. The near end speech flag is 106 decremented if the flag value is 108 greater than zero and either 98 near end signal power is less than far end signal power plus the low threshold or 100 the echo cancelled power is less than 90% of near end signal power while 96 far end signal power is below a far threshold value and the absolute value of the far end signal sample is less then 512.

The reason for the above logic is that in absence of a far end user, if a near end user is talking, this signal energy will be greater than the far end user's energy and the echo canceller will allow most of the signal to go through unsuppressed and the filter coefficient update will be prevented.

If far signal energy exceeds the FAR_THRESHOLD and the near_end_speech flag is non-zero, the near_end_speech flag decrements, provided the ERLE is better than 10 dB. Also, if a far end user were to cut in, the ERLE will not improve to 10 dB until the near end user goes away, hence preventing the flag from decrementing. This flag is very useful in preventing any clipping during double talk if the near end user began talking before the far end user. Once the ERLE gets better than 10 dB, the FG_near_end_speech_flag decrements in steps of one to zero. This flag indicates the condition where a near end user stops talking and the far end continues talking after providing for enough hangover for the trailing part of the near end user's speech.

Yet another preferred flag determination in the presently preferred method of detecting double talk is the double talk flag computation. There are two conditions for double talk, one is strong double talk and the other is weak double talk. If the near end signal power is greater than 75% of the far end signal power, the FG_strong_double_talk flag is incremented to a maximum of 24, else it is decremented to a minimum of zero. During a strong double talk condition the echo canceller update is frozen.

Figure 7A:
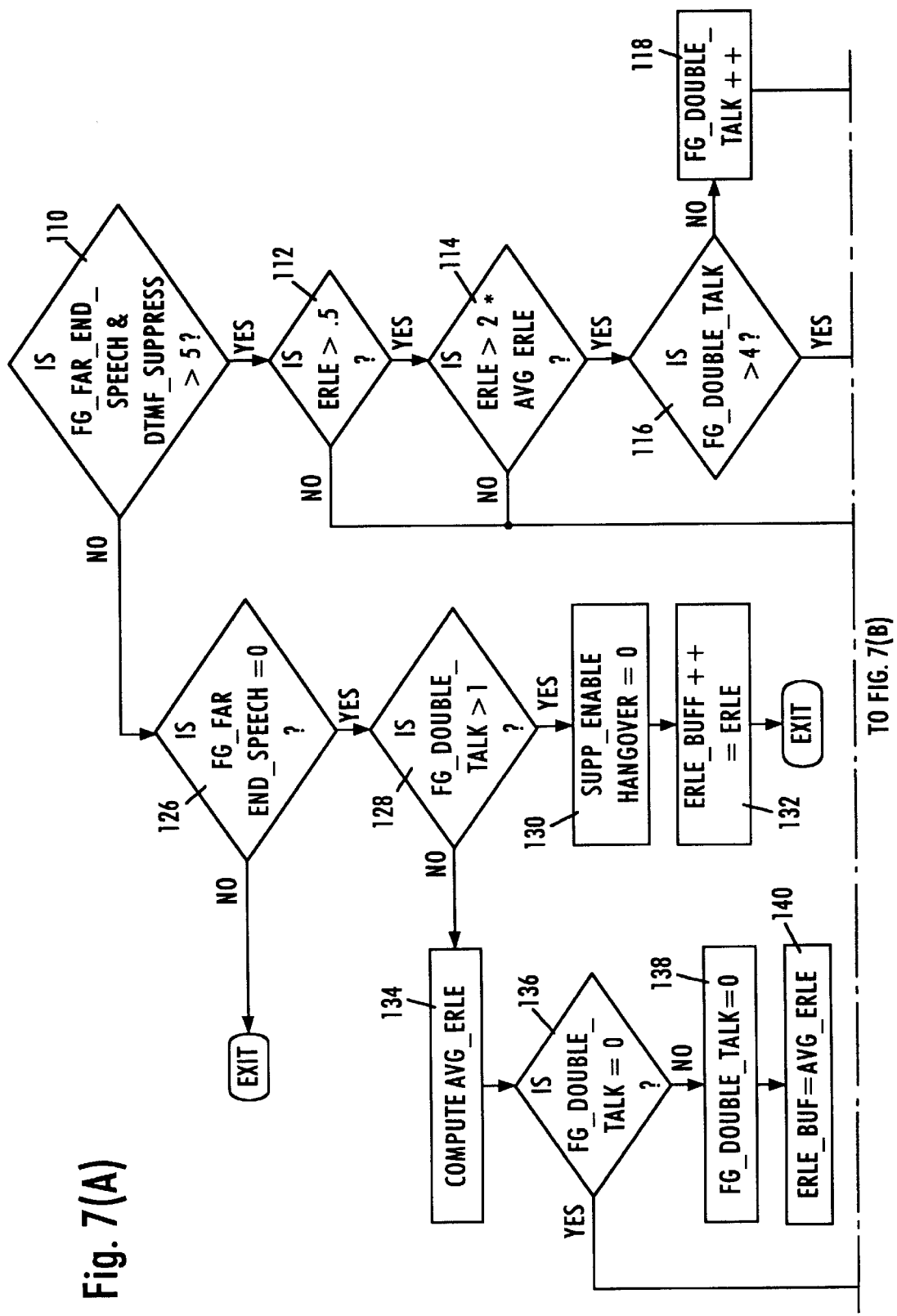
FIG. 7 is a flow diagram illustrating a preferred method of updating a double talk flag.
Figure 7B:
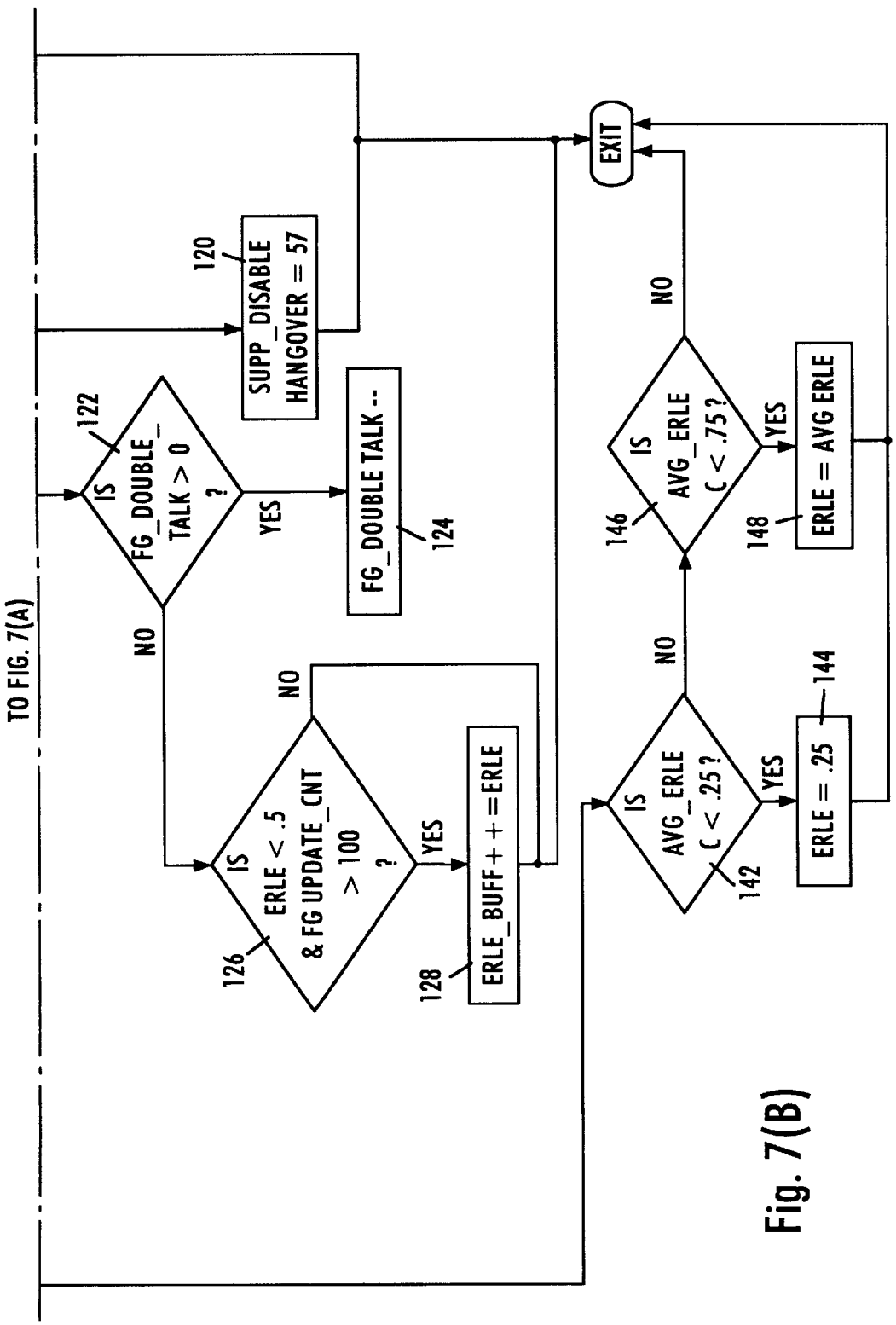

The double talk flag works on the concept of degradation of ERLE. As shown in FIG. 7, the double talk flag increments 118 if the echo canceller factor (ERLE) is 114 greater than two times the average ERLE and is 112 greater than 0.5 (=6 db). Also, the flag must 116 be less than a maximum value of 4. If, however, the flag is greater than 4, the suppressor_disable_hangover (the margin of time the echo suppressor in the echo canceller remains disabled beyond the predicted end of near end speech) counter is 120 set to 512 samples.

The double talk flag decrements 124 in steps of 1 if far end speech goes to zero or the ERLE improves. The suppressor is also deactivated when this flag's value is greater than 1. The decision on the value of the FG_double_talk flag is made every 20 milliseconds.

If there is 126 no far end speech and the double talk flag is 128 greater than 1, the echo suppressor enable hangover counter is set to zero and ERLE is saved in a buffer. If, however, there is 126 no far end speech and 128 the double talk flag is less than or equal to 1, then an average ERLE is 134 calculated. Then, if 136 the double talk flag is non-zero, the flag is 138 zeroed and the average ERLE calculated above is placed in a buffer 140.

After 134 computing the average ERLE, if 136 the double talk flag is zero then an analysis of the average ERLE is performed. First, if 142 the average calculated is less than 0.25, indicative of a good convergence in the echo canceller, the ERLE is 144 set to 0.25. If 146 the average is less than 0.75, the present value of ERLE is 148 the present value of the ERLE average. No change is made to ERLE if the average value is 0.75 or greater.

DTMF_suppress flag referenced by the above double talk flag process is set to zero when a DTMF digit is detected. Since it is a tonal input, the ERLE buffer is not updated as the ERLE obtained for tones may be much better than what might be obtained with speech. When the FG_double_talk flag reaches a value of 4, the suppressor disable hangover is set to 512. This forces the residual suppressor from not reactivating after the double talk is gone, for at least a period of 64 milliseconds. Also if far end speech is present, the ERLE buffer is updated if 100 or more of the last 160 samples caused the foreground filter coefficients to update. If far end speech goes away and the double talk flag is still set, then we update the ERLE buffer because, this condition can happen if the echo path characteristic and/or location changes. By updating the buffer and recomputing the averages, we allow the system to come out of double talk. The FG_double talk flag is set to zero to allow this update to occur only once per speech spurt. This minimizes the corruption of the average in case there was true double talk.

Figure 8A:
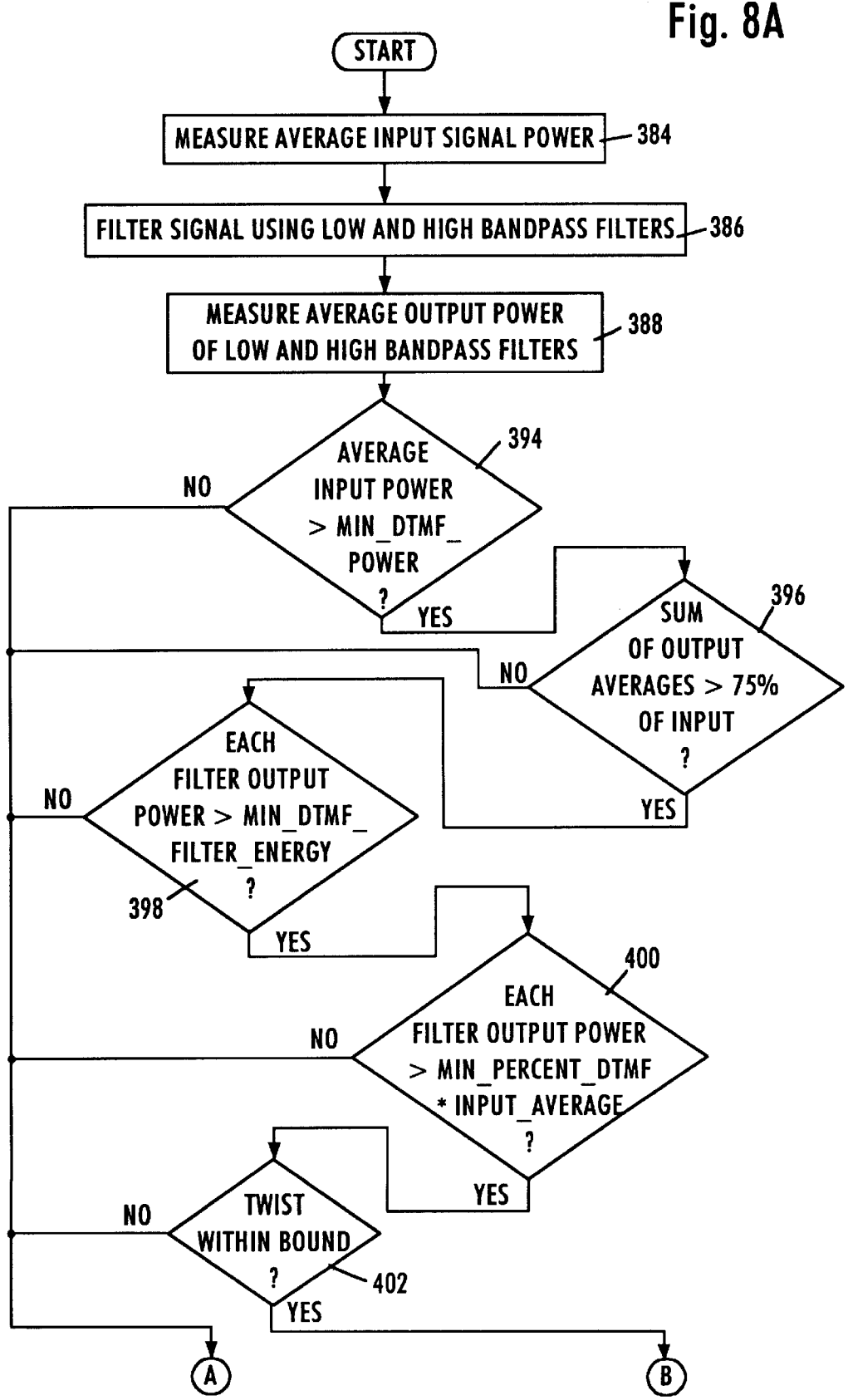
FIG. 8A is a flow diagram illustrating one method of detecting a DTMF tone that maybe used with the method of the present invention.
Figure 8B:
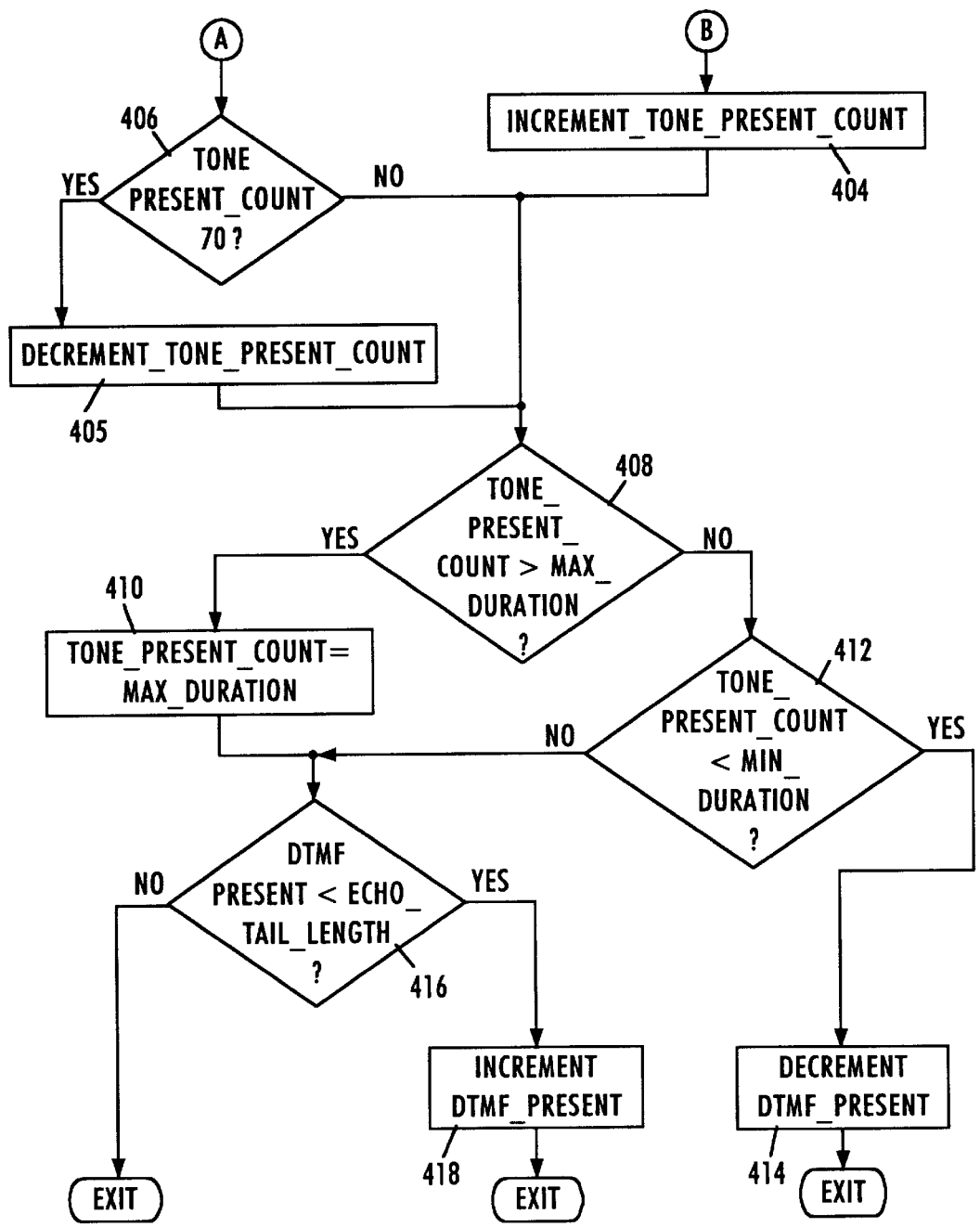
FIG. 8B is a continuation of the flow diagram of FIG. 8A.

The DTMF_suppress flag included in the double talk flag determination is the output of a DTMF detector. Any DTMF detector may be used to obtain the DTMF_suppress flag. Referring now to FIGS. 8A and 8B, one method of searching for a DTMF tone in an echo canceller is illustrated. This detector is primarily in place to detect DTMF digits so as to prevent any DTMF echo from going back to the originating port of the tones. The detector is preferably composed of two sixth order bandpass filters. One filter has a passband from 700 Hz to 950 Hz, corresponding to the low frequency group, and the other has a passband from 1200 Hz to 1650 Hz. This detector runs continuously and looks only at the far end signal to search for tones.

The input signal is passed through the two filters. A running average of the squares of the input signal 384 is computed over 128 samples. The filters then filter 386 the signal and an average output power is measured 388 for each filter. Each sample represents a 20 millisecond window of information in the received signal. The maximum input energy since the last time the far end signal went below a predetermined minimum energy (min_dtmf_energy) is saved. As shown in FIGS. 8A and 8B, tests are performed before a tone is declared present. First, the average input energy must be greater 394 than the min_dtmf_energy threshold. In one embodiment, the minimum DIMF threshold is −25 dBm. The detector then compares 396 the sum of the two output power averages of the filters with the input power to determine if the sum is greater than 75% of the input. The next test in the series of tests run on the signal is to determine 398 if the filter average is greater than a minimum threshold (Min_DTMF_Filter energy) for each of the two filters. The filter averages for each filter are also measured to determine 400 if they are greater than min_percent_DTMF multiplied by the average power input to the first filter.

The last test is verifying 402 that the twist between the two filters is within acceptable limits. Twist refers to the energy difference between the two filters. A positive twist (pos_twist) indicates that the energy on the higher frequency filler is lower than the energy on the lower frequency filter. A negative twist (Neg_twist) measures the opposite relationship, i.e. that the energy on the lower frequency filter is lower than the energy in the higher frequency filter is lower than the energy on the higher frequency filter. Preferably, the post_twist and neg_twist ranges are ±4 dB. If any of the above tests are false, the tone_present_cnt is greater than zero and tone present_cnt is 405 decremented. If all the above tests are true, tone_present_cnt is incremented 404.

After incrementing tone_present_cnt, or if 406 tone_present_cnt was less than or equal to zero, the detector compares 408 the tone_present_cnt value with a max_duration constant to see if the tone is within a predetermined duration range. If tone_present_cnt is greater than or equal to max_duration then tone_present_cnt is set 410 equal to max_duration. Otherwise, the detector determines 412 if tone_present_cnt is less than a minimum duration (min_duration). Dtmf_pres is decremented 414 if the counter is less than min_duration. Otherwise, the detector determines 416 if dtmf_present is greater than echo_tail_length. If it is greater than echo_tail_length, the dtmf_pres flag is incremented 418. Dtmf_suppress and dtmf_present flags are the outputs of the detector and are used by the echo suppressor for suppressing the near end echo.

Figure 9A:
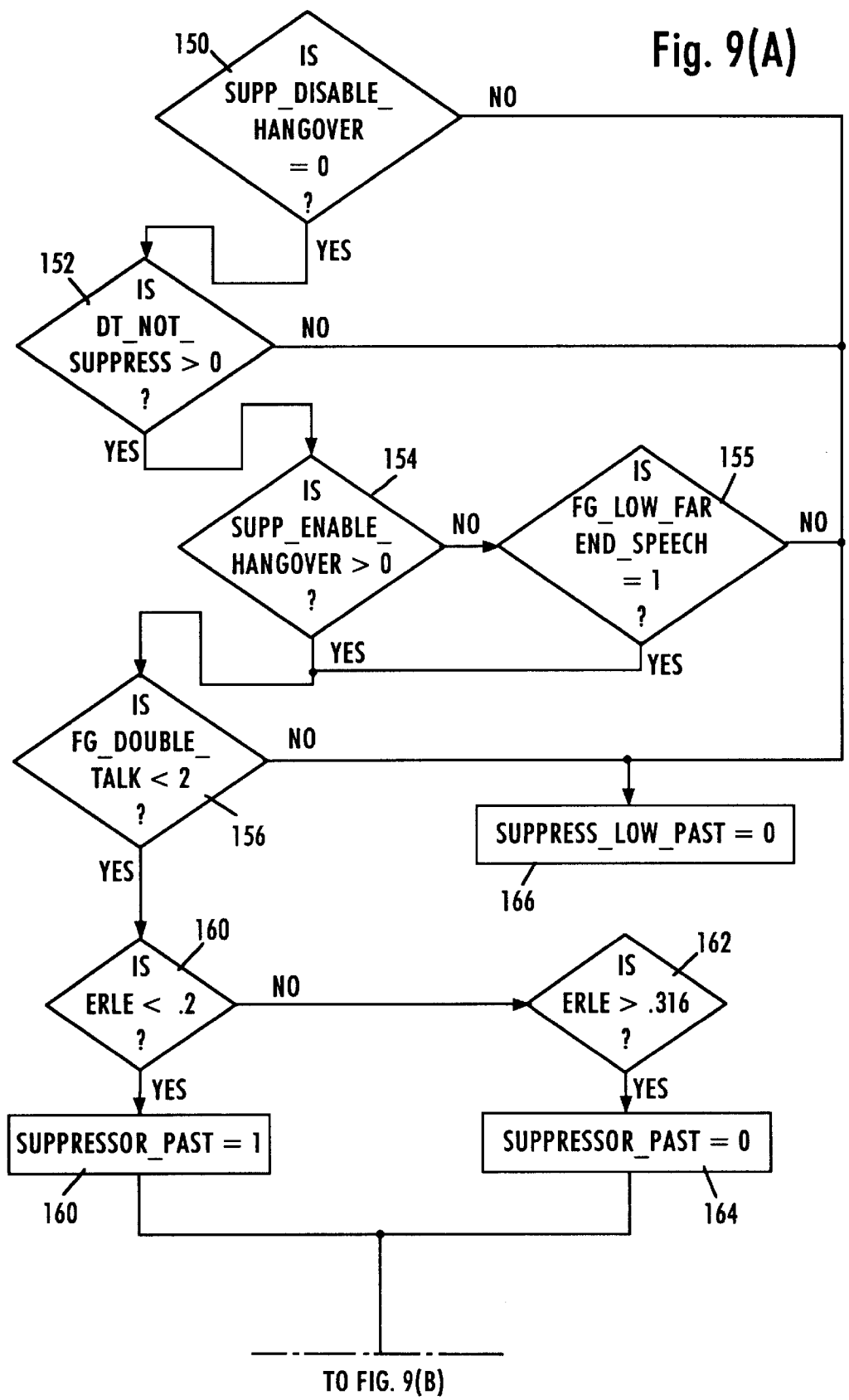
FIG. 9 is a flow diagram illustrating a preferred decision process for controlling an echo suppressor.
Figure 9B:
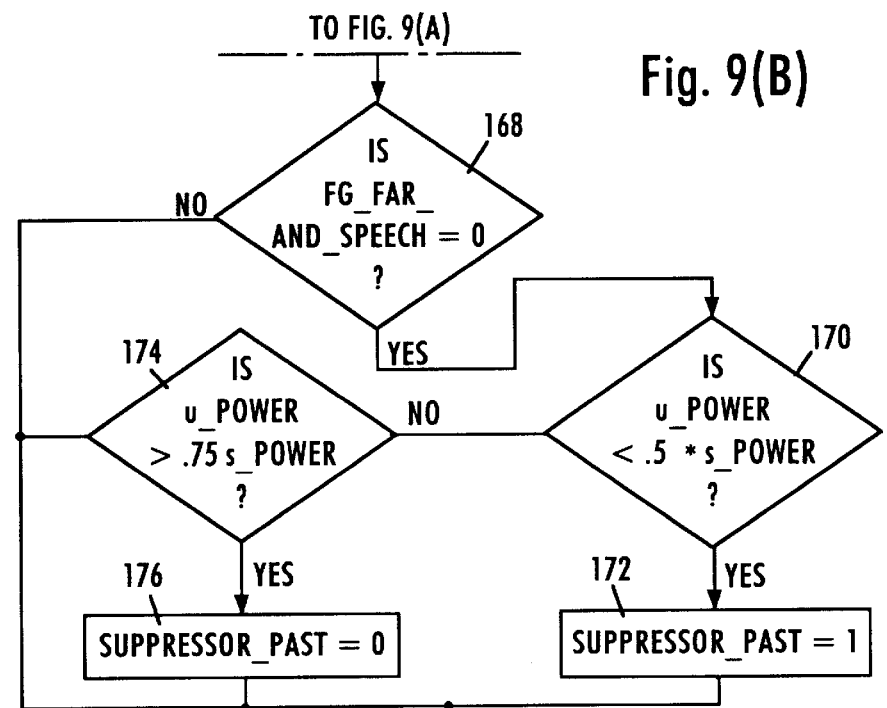

To remove the residual echo from the echo cancelled signal, the echo suppressor in the echo canceller is used. When just far end speech is present, the suppressor must not allow any echo to go through. At the same time, when there is near end speech, double talk or idle channel, it must deactivate itself. The echo suppressor operation depends on a number of parameters previously computed and some which are computed before the suppressor makes the decision to suppress or not to suppress. If the suppressor is enabled the process illustrated in FIG. 9 is used in the decision to suppress or not to suppress.

The suppressor will 160 set a suppress flag to suppress a signal (suppressor_past=1) if 150, 152 the suppressor disable hangover counter and the dialtone flag (dt_not_suppress) are zero, and 154, 155 either the suppressor hangover counter (supp_enable_hangover) is greater than zero or low level far end speech has been detected (FG_low_far_end_speech=1). In addition, the double talk flag 156 must be less than 2 and ERLE 158 must be less than 0.2. If all the above conditions are met, then the suppress flag will be set to suppress the signal. The echo suppress flag is cleared if ERLE is greater than 0.316 and all the other conditions are met.

At this point in the process of determining whether to suppress, far end speech signals and echo cancelled signal power are examined. If 168 no far end speech is detected, then if 170 echo cancelled signal power is less than half of the near end signal power the suppressor flag is set 172 to suppress. If 174 echo cancelled signal power is greater than 0.75 times the near end power, then 176 the suppress flag is set not to suppress.

Figure 10A:
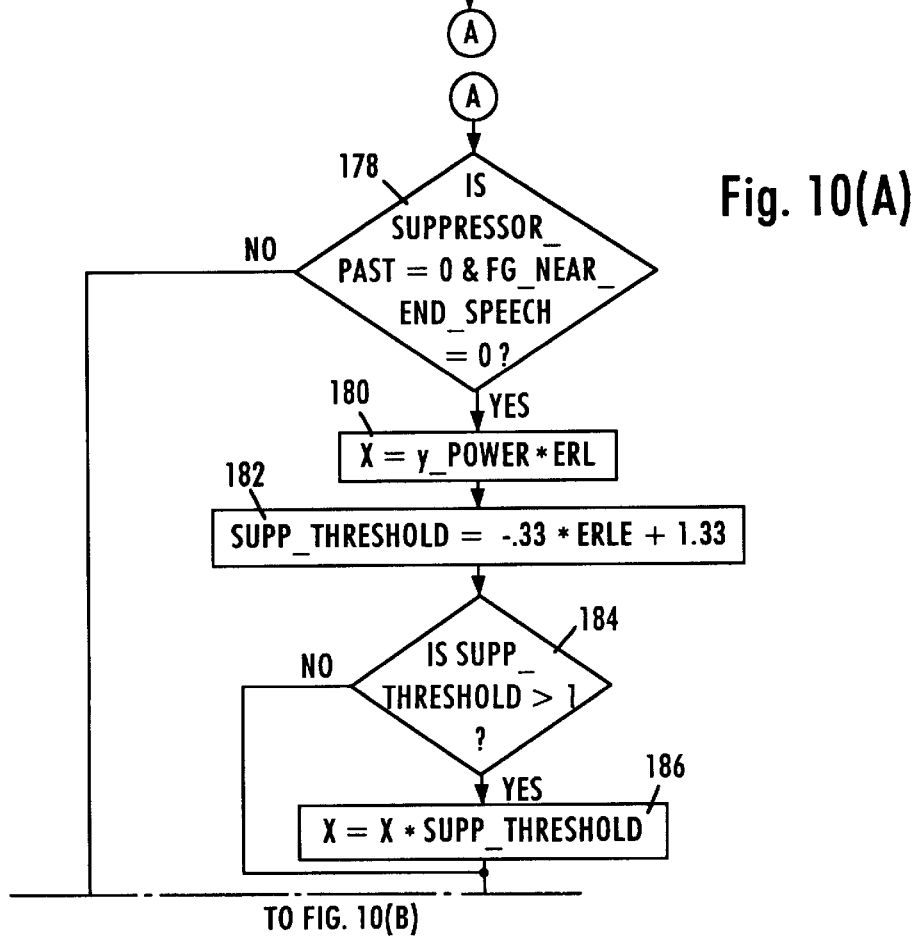
FIG. 10 is a continuation of the flow diagram of FIG. 9.
Figure 10B:
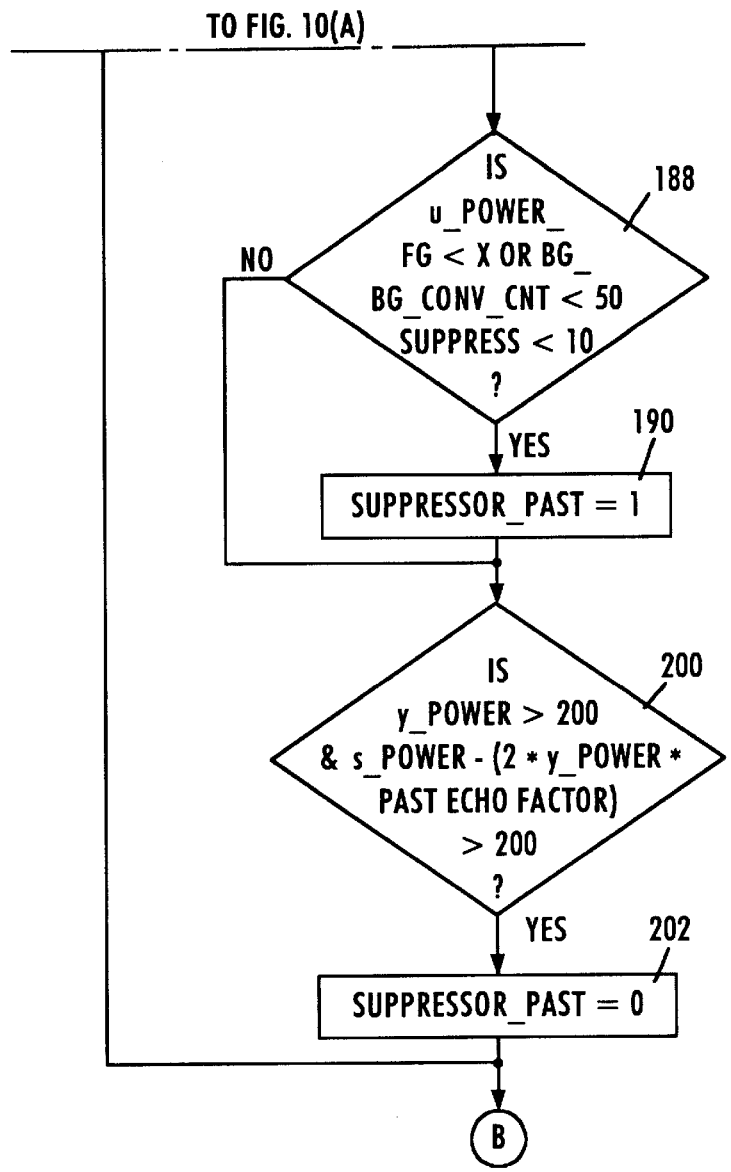

If 168 there is far end speech or neither of the echo cancelled signal power conditions 170, 174 are met, looks at the present state of the suppressor flag and the near end speech variable. Referring to FIG. 10, if the suppressor and near end speech flags 178 are zero then the result of far end signal power multiplied by ERL is 180 calculated and stored as a reference variable (x) and a suppressor threshold is 182 calculated. The suppressor threshold is preferably 0.33 times ERLE added to 1.33. If 184 the suppressor threshold is greater than 1, then the reference variable (x) is 186 recalculated by multiplying its previous value by the suppressor threshold.

The next step is 188 to determine if echo cancelled signal power is less than the reference variable or if dtmf_suppress is less than 10. If any of these are true, the suppressor flag is 190 set to suppress. If none of the three tests 188 are true then the suppressor flag is 202 set not to suppress if 200 both far end power is greater than 200 and near end power minus the result of twice the far end power times the past ERL value is greater than 200. Then, referring to FIG. 11, if 204 the a DTMF tone is present or the suppressor flag indicates that the echo suppressor should suppress (suppressor_past= 1), background noise is 206 injected.

Figure 11:
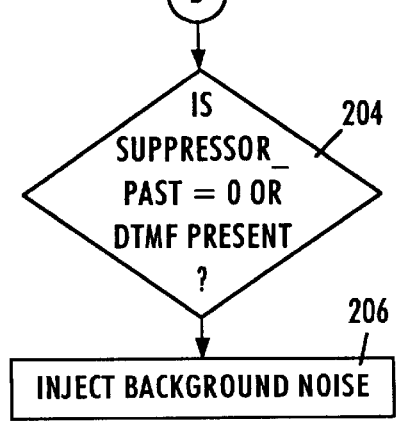
FIG. 11 is a continuation of the flow diagram of FIG. 10.

As can be seen in FIGS. 9–11, certain basic conditions must be met before the suppressor logic can be activated. Conditions preventing the suppressor logic from activating are supp_disable_hangover which is set on strong near end speech or maybe_near_end_speech and prevents clipping during double talk, dt_not_suppress when we detect a dialtone so that the DTMF digits following the dialtone are not clipped. FG_double talk prevents clipping during double talk which was detected due to degradation of ERLE. Supp_enable_hangover and FG_low_far_end_speech must be set which signals the presence of far end speech for the suppressor to be activated. Once inside the suppressor, if the ERLE is better than 0.2, we activate the suppressor and if it is worse than 0.316, we deactivate it. In case the echo canceller is looking at the trailing part of the near end speech, instantaneous ERLE is used to activate or deactivate the suppressor. If suppressor_past and FG_near_end_speech are zero, an attempt is made to set the suppressor variable (suppressor_past). If the echo canceller has recently been reset, just started a new call or u_power is below a threshold, then the suppressor_past is set to one. If y_power is greater than 200 and the difference between s_power and twice the y_power times past_echo_factor exceeds 200 then the suppressor_Past is reset. This logic is used to let DTMF digits pass in the presence of dialtone, in case the dialtone detector does not detect the dialtone.

Once the suppressor_past status is determined, it is logically "OR'ed" with the dtmf_resent flag. A non-zero value results in the echo cancelled sample u_value to be replaced with a zero if the noise buffer is not full and the contents of the buffer if it is.

According to a preferred embodiment of the present method, there are a number of flags whose values depend on a multiple of other flags. They control the operation of various internal echo canceller procedures such as the foreground filter update process, echo suppression, etc. A preferred method for determining these flags is illustrated in FIG. 12.

The suppressor hangover flag is 212 decremented if 210 the hangover flag value is still greater than zero and far end speech is not 208 present. If 208 far end speech is present and 214 either dtmf_present is greater than 40 or BG_conv_cnt is less than 3, then if 216 the near end speech flag is greater than 40, the near end speech flag is 218 set to 40 and the suppressor disable hangover counter 220 is set to zero. Alternatively, if 208 far end speech is present and 214 dtmf_present is less than 40, then if 222 the near end speech flag is non-zero, the flag is 224 decremented.

Next, if 226 if the near end speech and maybe near end speech variables are zero and the suppressor disable hangover counter is 228 less than or equal to zero then the suppressor disable hangover counter 230 is decremented. If both the near end and maybe near end flags are not zero or the suppressor disable hangover counter is greater than zero, then if 232 the suppressor enable hangover counter is less than the echo tail period, the suppressor enable counter is 234 set equal to the echo tail period.

Figure 12A:
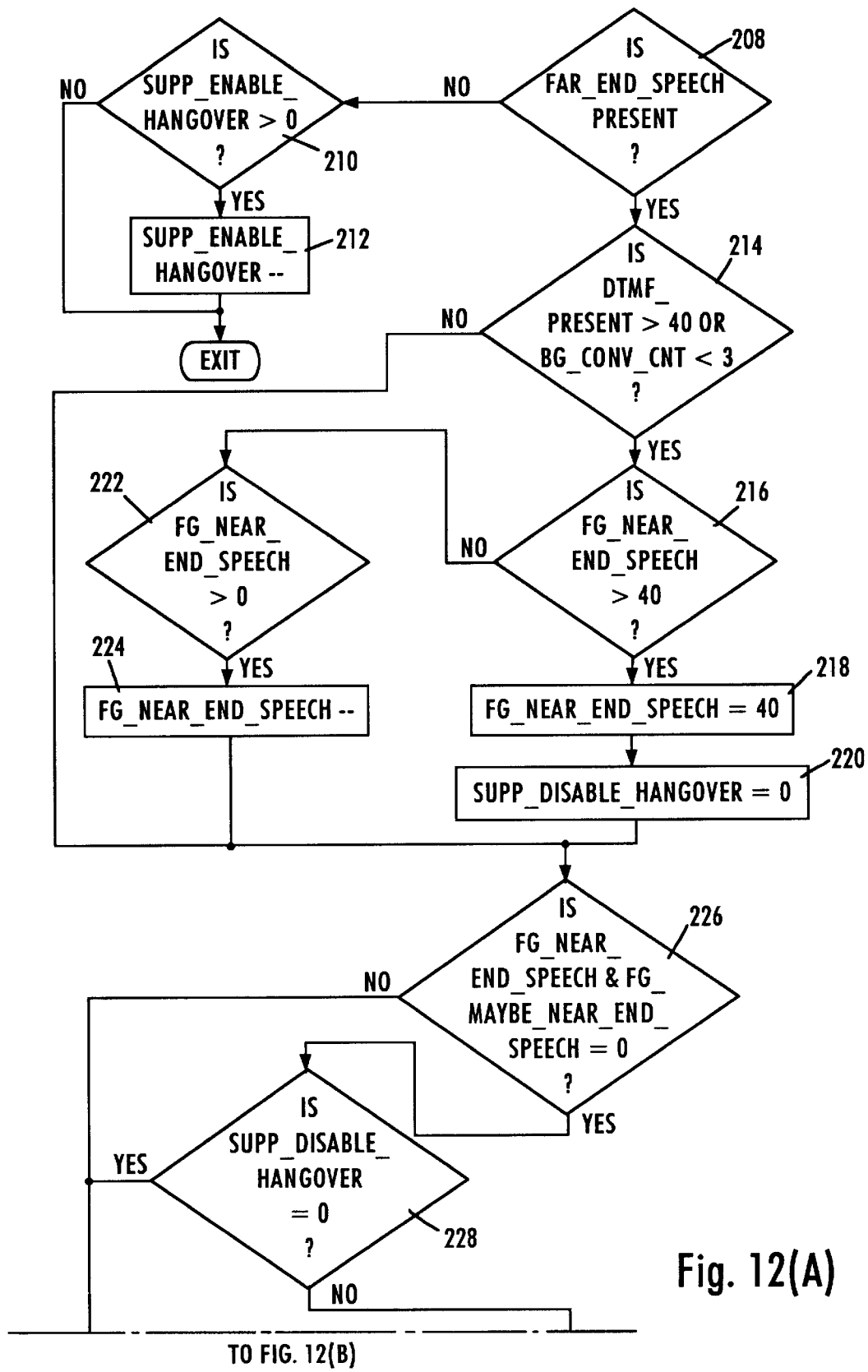
FIG. 12 is a flow diagram illustrating a process of determining flags for controlling internal echo canceller processes.

As shown in FIG. 12, to prevent the echo of the first DTMF digit at the beginning of the call, the FG_near_end_speech flag is set to a maximum of 40 and decremented in steps of one. Also the suppressor disable flag is reset to zero to allow the disabler to activate. This logic is also active when any DTMF digit sent over the channel is detected. After detection of double talk due to either the FG_near_end_speech flag or FG_maybe_near_end_speech flag, the suppressor disabler is decremented slowly when both the above conditions are gone to provide maximum hangover. The supp_enable_hangover flag is incremented when FG_far_end_speech is detected. This flag gives us the hangover after the far end speech goes away to may be continue suppressing. It decrements if FG_far_end_speech flag is zero.

Figures 12B, 13:
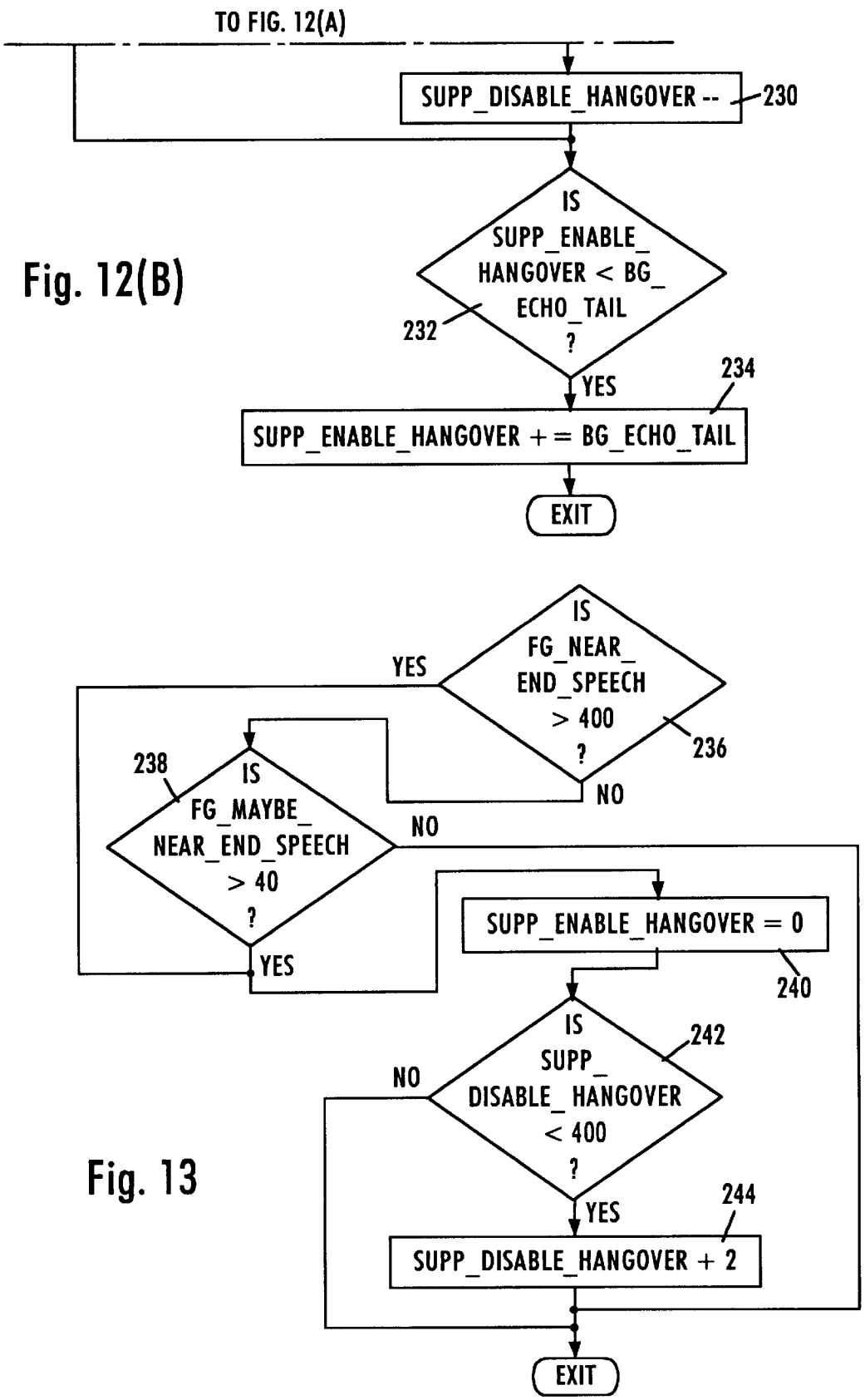
FIG. 13 is a flow diagram illustrating a method of updating suppressor hangover time.

FIG. 13 illustrates calculations performed to adjust suppressor hangover time in certain circumstances. If 236 either near end speech or 238 maybe near end speech is greater than or equal to 400, there is guaranteed near end speech and 240 the suppressor enable hangover counter is set to zero. The suppressor disable hangover counter, if 242 less than 400 increments 244 to a maximum of 400 in steps of 2. This flag can only start decrementing if far end speech comes and both FG_near_end_speech flag and FG_maybe_near_end_speech are reset or under idle channel conditions. This prevents any clipping once double talk is detected for a given speech spurt.

Figure 14:
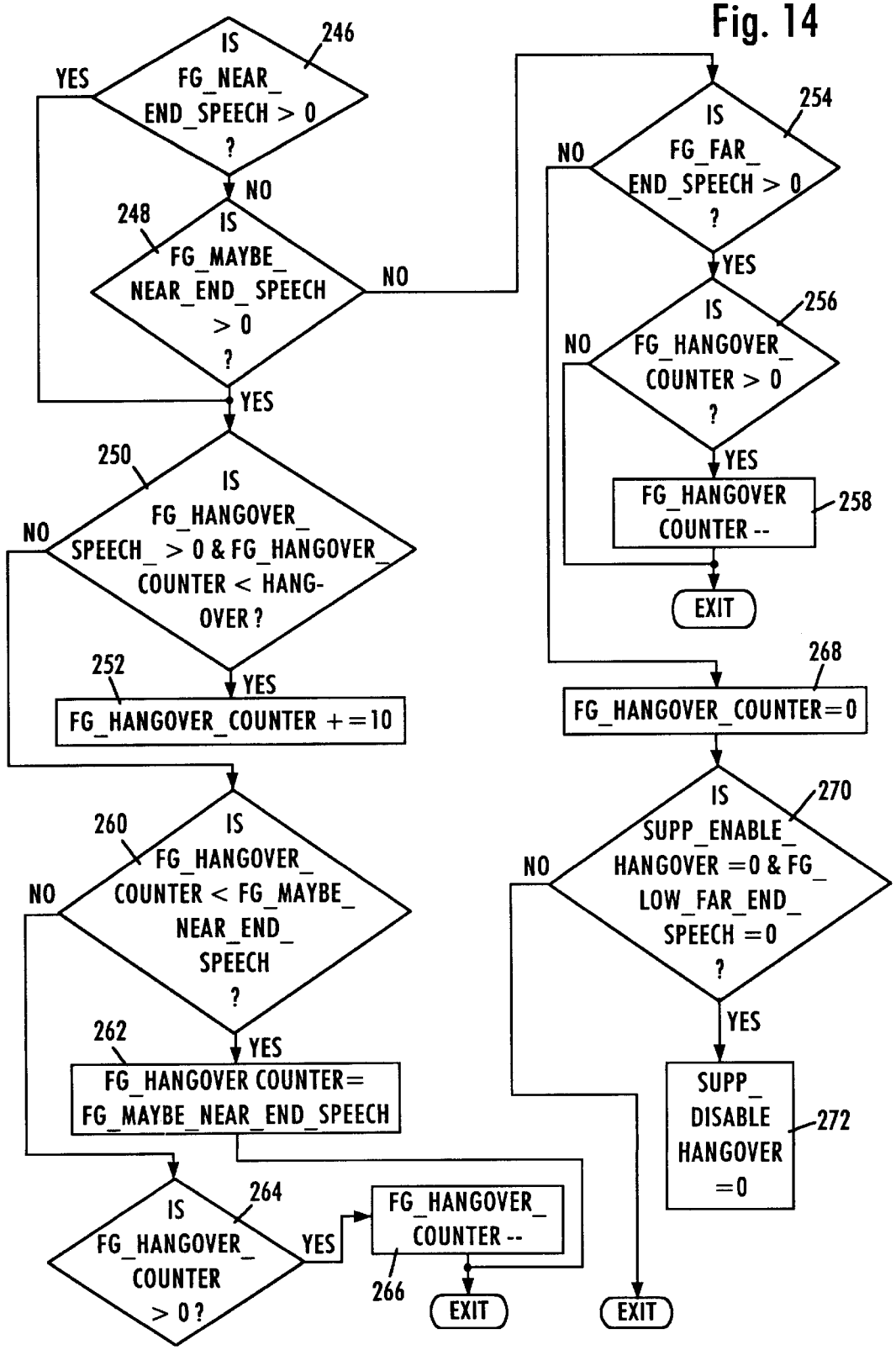
FIG. 14 is a flow diagram illustrating hangover counters for near end and far end speech.

To prevent the update of the echo canceller coefficients during near end speech or the slightest hint of double talk, FG_hangover_counter is used. Referring to FIG. 14, the hangover counter gets 252 set if either FG_near_end_speech flag or FG_maybe_near_end_speech flag is non-zero 246, 248 and the hangover counter is. The FG_double_talk flag is not used to freeze the coefficient update of the echo canceller coefficients. This is because, of the fact that the flag works based on ERLE. The ERLE can degrade due to change in echo path and freezing the coefficients will not allow the echo canceller to converge. The FG_maybe_near_end_speech flag issued to freeze updates because, although a change in ERL can cause the flag to trigger, it will recover since the ERL computation continues independently of the double talk detection.

Figure 15:
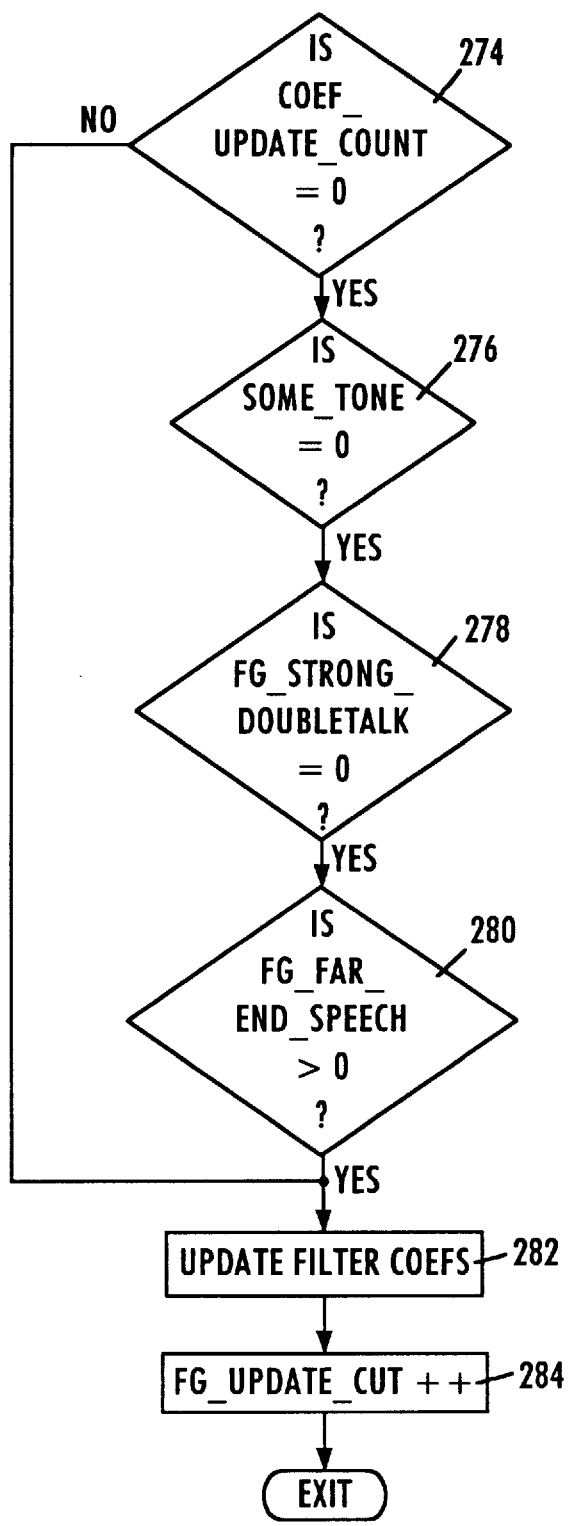
FIG. 15 is a flow diagram illustrating a decision process for updating echo canceller coefficient.

The quality of the error signal is very critical in the update process. The error function to be used in the update process is good only if it does not contain any near end speech. If there is near end speech in the error signal, and the echo canceller tries to minimize the error, it will diverge as no correlation exists between the far end and the near end speech. Hence it is essential not to update the filter coefficients in the presence of near end speech. Also in the presence of tones, a periodic signal, updating the coefficients can be detrimental as the correct location of the echo is impossible to locate. The echo canceller may converge in presence of tones but due to the incorrect location identification of the echo path, it might diverge when speech is input into the system. The conditions checked starting to update the filter taps are illustrated in FIG. 15.

FG_coef_update_count keeps track of how many coefficients have been updated. If 274 the coefficient update counter is zero, then if 276 no tone is present and 278 there is no strong double talk and the far end speech flag is 280 non-zero, then the filter coefficients 282 will be updated and the updated counter 284 is incremented. Alternatively, if 274 the coefficient update counter is not zero than the filter coefficients will be 282 updated and the counter 284 incremented. Each time the coefficients are updated, all of them are forced to be updated the same number of times. The update process cannot stop after updating part of the coefficients, even though either near end speech is suspected, or a tone has been detected or there is strong double talk or the far end speech is gone. FG_update_cnt is a variable which is set to zero at the beginning of each 20 milliseconds frame and increments by one for each update. If all 160 samples in the frame are updated, FG_update_frame is incremented by one for each frame to a maximum of 3, else it is set to zero. FG_update frame is used by the background process to determine when it should update its filter coefficients or not.

A method in which double talk is detected based on the dynamics of the echo path and signals has been described. The preferred method incorporates measurements and calculations of far end, near end and maybe near end signal powers to derive an echo factor and improve the double talk detector process over straight echo canceller factor (ERLE) comparisons with near end signal energy. The result is a double talk detector which works reliably under differing conditions.

It is intended that the foregoing detailed description be regarded as illustrative rather than limiting, and that it be understood that the following claims, including all equivalents, are intended to define the scope of this invention.

What is claimed is:

1. A method of detecting double talk in an echo canceller comprising the steps of:

determining a near end signal power, a far end signal power and an echo cancelled signal power in a speech communication;

determining near end speech presence, far end speech presence, and maybe near end speech presence;

calculating an echo factor and an echo canceller factor with the near end, far end and echo cancelled signal powers;

setting a double talk flag based on said echo canceller factor and said near end, far end and echo canceled signal powers;

wherein the step of determining maybe near end speech further comprises declaring maybe near end speech presence if the far end signal power is greater than a threshold amount, the near end signal power is greater than two times a measured background system noise, and the near end signal power is greater than two times the far end signal power multiplied by said echo factor whereby clipping of speech is prevented if the near end user begins speaking while the far end user is speaking.

2. The method of claim 1 wherein the step of determining near end speech comprises the steps of:

Determining if far end signal power is below a predetermined threshold;

Determining that near end signal power is less than far end signal power plus a threshold amount;

Calculating whether the echo cancelled signal power is greater than a fixed percentage of near end signal power; and Updating a near end speech variable based on said determinations and calculations.

3. The method of claim 1 wherein the step of determining far end speech presence further comprises declaring the presence of far end speech if far end signal power is greater than a predetermined far end threshold value.

4. The method of claim 1 wherein the step of calculating an echo factor and an echo canceller factor comprises calculating said echo factor and said echo canceller factor only if far end signal power is greater than a predetermined far end threshold value.

5. The method of claim 1 wherein the step of calculating a echo canceller factor comprises averaging the ratio of echo canceller signal power to near end signal power over 512 samples.

6. A method of detecting double talk in an echo canceller comprising the steps of:

determining a near end signal power, a far end signal power and an echo canceled signal power in a speech communication;

determining near end speech presence, far end speech presence, and maybe near end speech presence;

calculating an echo factor and an echo canceller factor with the near end, far end and echo cancelled signal powers;

setting a double talk flag based upon said echo canceller factor and said near end, far end and echo canceled signal powers; and incrementing a strong double talk flag if near end signal power is greater than 75% of the far end signal power.

7. The method of claim 6 wherein echo canceller filter coefficients are not updated if strong double talk is detected.

8. The method of claim 1 wherein the step of controlling the echo suppressor in the echo canceller further comprises disabling the echo suppressor if near end speech is detected.

9. The method of claim 1 wherein the step of calculating said echo canceller factor comprises averaging the ratio of echo canceller signal power to near end signal power over 512 samples.

10. A method of detecting double talk in an echo canceller comprising the steps of:

determining a near end signal power, a far end signal power and an echo cancelled signal power and a speech communication;

determining near end speech presence, far end speech presence, and maybe near end speech presence;

calculating an echo factor and an echo canceller factor with the near end, far end and echo cancelled signal powers;

setting a double talk flag based on said echo canceller factor and said near end, far end, and echo canceled signal powers;

wherein the step of setting the double talk flag further comprises incrementing said flag if the echo canceller factor increases to two times an average echo canceller factor value, and if the echo canceller factor value is greater than about 6 dB.

11. The method of claim 10 wherein the step of determining near end speech comprises the steps of:

determining if far end signal power is below a predetermined threshold;

determining that near end signal power is less than far end signal power plus a threshold amount;

calculating whether the echo canceled signal power is greater than a fixed percentage of near end signal power; and updating a near end speech variable based on said determinations and calculations.

12. The method of claim 10 wherein the step of determining far end speech presence further comprises declaring the presence of far end speech if far end signal power is greater than a predetermined far end threshold value.

13. The method of claim 10 wherein the step of calculating an echo factor and an echo canceller factor comprises calculating said echo factor and said echo canceller factor only if the far end signal power is greater than a predetermined far end threshold value.

* * * * *